UNITED STATES PATENT OFFICE.

HARRY O. DUERR, OF WILMINGTON, DELAWARE.

PROCESS FOR MAKING ARTIFICIAL STONE AND THE STONE.

No. 873,849.  Specification of Letters Patent.  Patented Dec. 17, 1907.

Application filed October 29, 1907. Serial No. 399,752.

*To all whom it may concern:*

Be it known that I, HARRY O. DUERR, a citizen of the United States, residing at Wilmington, in the county of Newcastle and State of Delaware, have invented new and useful Improvements in Processes for Making Artificial Stone and the Stone, of which the following is a full, clear, and exact specification.

The invention or discovery herein described has for its object the production of such artificial stone as will possess all the qualities of natural stone, i. e., strength, texture, durability, impermeability and color. At the same time I have sought to produce a product that is capable of being dressed and otherwise treated as natural stone and which shall contain no ingredients which by the action of weather or time shall tend to disintegrate, disrupt, discolor, or be injurious to the product.

In preparation for the manufacture of the herein described product the following materials or ingredients are selected:

1. A quantity of suitable silicious material, silica, or sand.

2. A properly burned high calcium lime or a hydraulic lime.

3. A suitable cement constant in volume, that is, one that will pass the accelerated test for soundness as specified by the American Society for Testing Material. The function of the cement is to serve as a temporary binder, holding together the ingredients until the silication in the steam chamber has proceeded to a sufficient degree to insure coherence in the block. It seems probable that the cement, which is preferably of a silicious character, as indicated above, is itself affected by the steam treatment and becomes more or less completely united with and made a part of the calcium silicate formed from the union of the lime and finely divided sand. That is, I have I believe to some extent at least a single binder in effect, though one complex in character, and not a simple dual binder formed by the mere adding together of two primary binders. I prefer a quick setting cement.

In carrying out my process various combinations may be made with the ingredients above mentioned and substantially the same product will result therefrom.

Inasmuch as different cements are characterized by different shades of color, manifestly when different cements are used, different effects in the product will result so far as the color is concerned.

In order to produce my product I am generally obliged to grind all or part of the silicious material, silica, or sand, sufficiently fine so that all or most of the voids in the composite mass are filled. Of course if the silicious material, silica, or sand used, in its natural state, is fine enough to accomplish the end above set forth, then grinding will not be necessary.

Besides filling the voids as above described, the finely divided silicious material, silica, or sand performs the additional important function of increasing the facility of the chemical or indurating action which takes place in the curing process.

Having thus described the ingredients which enter into my product, I will now describe the method by which I carry out my process.

Preferably I first roast a quantity of silicious material, silica, or sand, quenching this material with water as it comes from the roaster. This is done for the purpose of making the silicious material, silica, or sand into a more amorphous state thereby facilitating the chemical action. Then I grind the material roasted and lime together. If the lime is unhydrated I add sufficient water to the product to chemically hydrate the lime, seasoning the mixture in bins or silos for a sufficient length of time to complete the hydration. After the hydration, cement is added to this product and ground. To this ground mixture is then added coarser silicious material, silica, or sand, and then the compound is rendered plastic by the addition of sufficient water to render it capable of being molded. It may then be molded in any suitable way to any desired form after which it is cured by subjecting it to the action of steam under pressure in any suitable manner.

The proportions of ingredients used in the formula above described varies somewhat with the results sought and the special requirements of each case. In general it may be said that the proportions of silicious material, silica, or sand, and lime used should be such that when ground, mixed together and then combined with water and cured, there will be produced a perfect product of silicates of lime; in practice I have found that substantially this result may be insured by using about two (2) parts of silica to one (1)

part of lime. To the above mixture may then be added approximately one (1) part of cement and six (6) parts of silicious material, silica, or sand. The relative proportions of these ingredients will vary however according to the coarseness of the unground silicious material, silica, or sand, the object being in all cases to fill the voids existing in the silicious material, silica, or sand. Also by varying the proportions and kinds of cement used, many varieties of product will result which will differ in texture, quality, color and appearance.

I do not intend to confine myself to the above proportions or mixture as these must be varied to suit local conditions of materials to be used and results sought for.

The hereinbefore described preferable method by which I carry out my process may be departed from in the following particulars without substantially affecting the result produced depending somewhat upon the character of the silicious material, silica, or sand. Thus the roasting of silicious material, silica, or sand, may be omitted entirely; or the grinding of the mixture of lime, silicious material, silica, or sand, and cement may be omitted. Or the silicious material, silica, or sand, may be ground separately; then mixed with quicklime and the mixture hydrated after which the process proceeds as above set forth. Or the lime may first be hydrated; then mixed with silicious material, silica, or sand, and the mixture ground after which the process proceeds as described. Or the lime may first be hydrated; then the silicious material, silica, or sand ground separately and then the two materials mixed after which the process proceeds as described. Or in case the natural silicious material, silica, or sand is sufficiently fine without grinding then that step of the process may be dispensed with and the lime may be first hydrated and then mixed with unground silicious material, silica, or sand, or the lime may be mixed with the unground silicious material, silica, or sand, and the mixture hydrated after which the process proceeds as hereinbefore described.

It is obviously impossible to set forth herein all the possible variations which may be made in the proportions of the ingredients used, for my process or the exact quality of the cement used, or the exact degree of fineness required for the silicious material, silica, or sand, and cement but all these matters must be determined by him who is skilled in the art in accordance with the requirements of the article it is desired to produce.

In several of the claims herein I have set forth as an element of my process "the hydration of said mixture" or "hydrating said mixture". It is to be understood that this step of my process is necessary only in case unhydrated lime is used and it will be likewise clear that if hydrated lime be used this step of my process will not be necessary.

Having thus described my invention what I claim is:

1. The process of making artificial stone comprising the roasting of silicious material; grinding said roasted material with lime; the hydration of said mixture; grinding said mixture with cement; mixing said ground mixture with a coarser silicious material; adding sufficient water to said compound to render it plastic; molding it to any desired form, and then subjecting it to an indurating action, substantially as set forth.

2. The process of making artificial stone comprising the mixing of finely divided silicious material with lime; the hydrating of said mixture; mixing said mixture with a coarse silicious material and a cement; adding sufficient water to said compound to render it plastic; molding it to any desired form, and then subjecting it to the action of steam under pressure, substantially as set forth.

3. The process of making artificial stone comprising the grinding of silicious material and lime together; hydrating said mixture; mixing the product with a coarser silicious material and a cement; adding sufficient water to render the compound plastic; molding it to any desired form, and then subjecting it to the action of steam under pressure, substantially as set forth.

4. The process of making artificial stone comprising the roasting of silica; grinding said roasted silica with lime; the hydration of said mixture; grinding said mixture with cement; mixing said ground mixture with a coarser silica; adding sufficient water to said compound to render it plastic; molding it to any desired form, and then subjecting it to the action of steam under pressure, substantially as set forth.

5. The process of making artificial stone comprising the mixing of finely divided silica with lime; the hydrating of said mixture; mixing said mixture with a coarser silica and a cement; adding sufficient water to said compound to render it plastic; molding it to any desired form, and then subjecting it to the action of steam under pressure, substantially as set forth.

6. The process of making artificial stone comprising the grinding of silica and lime together; hydrating said mixture; mixing the product with a coarse silica and a cement; adding sufficient water to render the compound plastic; molding it to any desired form, and then subjecting it to the action of steam under pressure, substantially as set forth.

7. The process of making artificial stone comprising the roasting of sand; grinding said roasted sand with lime; the hydration of said mixture; grinding said mixture with cement; mixing said ground mixture with a coarser sand; adding sufficient water to said compound to render it plastic; molding it to any desired form, and then subjecting it to the action of steam under pressure, substantially as set forth.

8. The process of making artificial stone comprising the mixing of finely divided sand with lime; the hydrating of said mixture; mixing said mixture with a coarser sand and a cement; adding sufficient water to said compound to render it plastic; molding it to any desired form, and then subjecting it to the action of steam under pressure, substantially as set forth.

9. The process of making artificial stone comprising the grinding of sand and lime together; hydrating said mixture; mixing the product with a coarser sand and a cement; adding sufficient water to render the compound plastic; molding it to any desired form, and then subjecting it to an indurating action, substantially as set forth.

10. An artificial stone composed of a calcium silicate formed by the union of a finely divided silicious material and lime, a coarser silicious material in such quantity that the voids thereof are substantially filled by the components of the calcium silicate and a suitable cement, substantially as described.

11. An artificial stone composed of a calcium silicate formed by the union of a finely divided silica and lime, a coarser silica in such quantity that the voids thereof are substantially filled by the components of the calcium silicate and a suitable cement, substantially as described.

12. An artificial stone composed of a calcium silicate formed by the union of a finely divided sand and lime, a coarser sand in such quantity that the voids thereof are substantially filled by the components of the calcium silicate and a suitable cement, substantially as described.

HARRY O. DUERR.

Witnesses:
CHARLES W. ROBINSON,
JOHN WHITE, Jr.